United States Patent [19]

Vinel et al.

[11] 4,181,380

[45] Jan. 1, 1980

[54] SELF ALIGNING CLUTCH RELEASE BEARING

[75] Inventors: René Vinel, Bourg la Reine; Jean-Pierre Querton, Maison Alfort; Claude Serville, Clamart, all of France

[73] Assignee: SKF Compagnie d'Applications Mécaniques, Clamart, France

[21] Appl. No.: 888,720

[22] Filed: Mar. 21, 1978

[51] Int. Cl.² ............................................. F16C 19/10
[52] U.S. Cl. ...................................... 308/233; 192/98; 308/184 A
[58] Field of Search ................ 308/233, 26, 234, 3 R, 308/232, 194, 235, 236, 184 A, 184 R; 192/98

[56] References Cited

U.S. PATENT DOCUMENTS

| 4,013,327 | 3/1977 | Kunkel et al. | 308/233 |
| 4,117,916 | 10/1978 | Baker | 192/98 |

FOREIGN PATENT DOCUMENTS 2317550  2/1977  France ............................. 192/98

*Primary Examiner*—Douglas C. Butler
*Attorney, Agent, or Firm*—Beveridge, DeGrandi, Kline & Lunsford

[57] ABSTRACT

A self aligning clutch release bearing, mountable on a guide tube in a clutch assembly, includes inner bearing race tube and a rigid guide socket. An elastic collar affixed to the interior of the bearing race tube is provided with resilient internal projections which contact the guide tube and permit slight lateral shifting of the bearing race with respect to the guide tube. A rigid guide socket rides on the guide tube and has a radial flange which frictionally engages a corresponding radial flange on the bearing race tube to deter inclination of the inner bearing race tube relative to the guide tube.

7 Claims, 7 Drawing Figures

SELF ALIGNING CLUTCH RELEASE BEARING

BACKGROUND AND SUMMARY

The present invention relates to an elastically self-aligning clutch release bearing for plate clutches and more particularly for diaphragm clutches. This release bearing includes a roller bearing assembly in which one of the rings is equipped with an elastic collar which allows axial sliding and permits the radial and rotary movement of the other, diaphragm-contacting ring, each time the clutch is disengaged.

Clutch release bearings are preferably provided with an elastic device which allows a certain movement of the release bearing relative to the shaft of the vehicle gearbox or relative to the guide tube on which the release bearing moves. One of the two rings of the ball-race of such a release bearing which transmits the declutching forces contacts the diaphragm continuously or intermittently, while the other ring receives the thrust of the declutching release yoke. The diaphragm-contacting ring, for example the inner ring of the ball-race, generally has a toric support face since the release bearing is not centered precisely on the shaft of the gearbox nor is perfectly aligned relative to the axis of rotation of the diaphragm. Furthermore, the geometrical axis of the clutch diaphragm, its axis of rotation and the axis of the shaft of the gearbox or of the guide tube do not always coincide exactly, which makes it still more necessary to enable some lateral movement of the release bearing at each declutching operation.

It has already been proposed to produce clutch release bearings of this type which are capable of automatic alignment at each declutching operation. In these release bearings, elastic elements of varying shape are interposed between one of the rings of the ball-race and the guide tube. Thus, in French Patent Application No. 75/21,447 (Publication No. 2,317,550) filed by the owner of the present invention, the release bearing has an elastic collar provided with internal radial ridges, which come into direct contact with the guide tube. These ridges have a particular structure which ensures both the rigidity and flexibility required for correct and repeated functioning of the release bearing during the functioning of the vehicle clutch.

In the frequent instance where the different teeth of the diaphragm contacted by the release bearing ring do not all occupy exactly the same position, such bearing-clutch contact tends to pivot or incline the bearing about an axis at right angles to the normal axis of movement of the release bearing. If such a clutch release bearing is actuated by a pivoted release yoke, there is no other means of preventing a pivoting movement of the release bearing, which results in premature wear of the contact surface of the diaphragm.

It is an object of the present invention to overcome this disadvantage and to permit the production of a clutch release bearing which has a guide collar which deters any pivoting or inclination of the clutch release bearing, regardless of the inaccuracies of manufacture of the diaphragm and the mounting of the clutch release yoke.

The elastically self-aligning clutch release bearing of the invention comprises a ball-race or the like equipped with thin-walled tubular inner and outer rings, the inner ring being able to slide on a guide tube via a collar of elastic material which possesses, on one portion of its inner surface, resilient projections which contact the guide tube. Preferably, these projections are a plurality of radial ridges parallel to the axis of the release bearing and inclined relative to the radial direction. When the release bearing slides under the action of the thrust of the declutching release yoke, these resilient projections remain in direct contact with the guide tube. The clutch release bearing also includes a guide socket make of a rigid material, preferably metal, which extends at least partially between the inner ring and the guide tube. The guide socket has a radial flange, i.e. a flange perpendicular to the axis of movement of the release bearing, in frictional contact with a corresponding radial flange of the inner ring.

In a first embodiment, the elastic collar of the release bearing possesses, over its length, a portion of lesser thickness which permits seating the guide socket, without the latter coming into contact with the elastic collar during declutching operations. The guide socket preferably possesses outward-pointing radial rims which cooperate with an annular groove formed on the inner surface of the elastic collar. When the release bearing is mounted on the guide tube, the dimensions of these rims and the depth of the annular groove are such that the guide socket does not come into contact with the elastic collar regardless of the radial movement of the release bearing during a declutching operation. This particular structure, however, retains the guide socket firmly on the release bearing when the bearing is not on the guide tube, thus facilitating its handling.

In another embodiment, the elastic collar furthermore possesses a plurality of auxiliary radial ridges which lie parallel to the axis of the release bearing and come into contact with the outer surface of the guide socket. These radial ridges may have the same general structure as the ridges which come into direct contact with the surface of the guide tube, but they are preferably more flexible. The role of the auxiliary ridges is to hole the guide socket on the bearing ring before the release bearing is mounted on the guide tube. As in the previously-described embodiments, the self-alignment of the release bearing is ensured almost exclusively by the radial ridges of the elastic collar which come into direct contact with the guide tube.

In order to maximize the total length of the guiding provided by the guide socket while leaving a sufficient number of radial ridges in direct contact with the guide tube, the invention also proposes, in an advantageous embodiment, to provide the guide socket with axial extensions which form portions of substantially the same length as the total length of the elastic collar. Opposite these guide socket extensions, the elastic collar is free from the radial ridges which lie only between these extensions to contact the guide tube.

In another embodiment which makes it possible to achieve substantially the same effect, the guide socket has an annular fold located outside the release bearing.

In all cases, the resilient internal projections of the inner surface of the collar preferably are ridges having a profile which becomes thinner towards the inside to enable deformation of the ridges during each declutching operation, both by compression of the material in the radial direction and be flexing in the tangential direction. The ridges are also preferably inclined relative to the radial direction so as to increase their flexibility.

The present invention will be better understood by examining some particular embodiments which are ex-

THE DRAWINGS

BRIEF DESCRIPTION OF PREFERRED EMBODIMENTS

Figure 1:
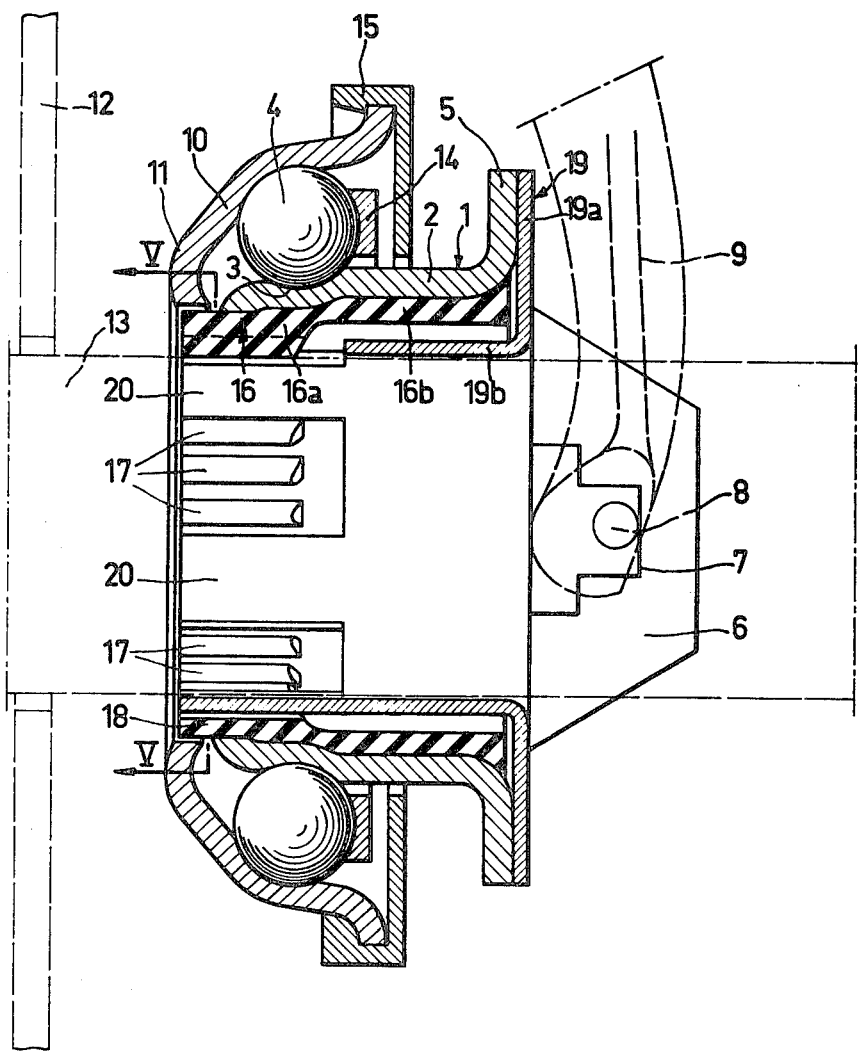
FIG. 1 is a view in cross-section of a first embodiment of a clutch release bearing according to the invention.
Figure 5:
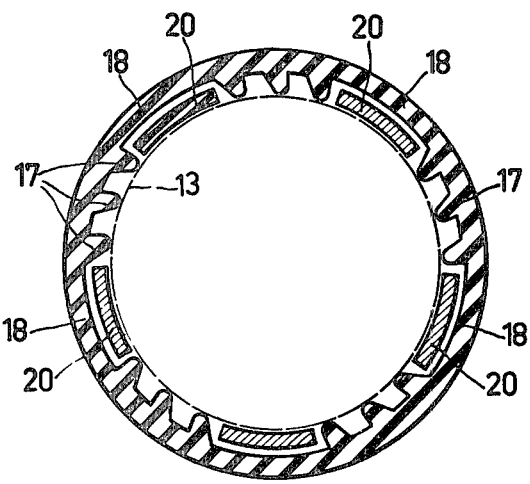
FIG. 5 is a section along V—V of FIG. 1.

As shown in FIGS. 1 and 5, the clutch release bearing has an inner ball-race ring 1 formed by stamping a metal sheet or a tube. The ring 1 has a tubular part 2 and a toric roller track 3 for a set of balls 4. A radial flange 5 on tubular part 2 has two lugs 6 which extend parallel to the axis of the release bearing. Each lug 6 has a cut-out 7 which co-operates with a retractor spindle 8 of a control release yoke 9, these elements being shown in broken lines in FIG. 1. It will be appreciated that other connections to the release yoke may be envisaged.

The ball-race of the clutch release bearing is completed by an outer ring 10, also having a thin wall produced by stamping a metal sheet or a tube. The balls are held between tubes 2 and 10 by a cage 14, the bearing race being protected by a cover 15 and sealing rings which are not shown. The outer ring 10 has a toric portion 11 for contacting the diaphragm 12 shown in broken lines in FIG. 1. This contact occurs when the release yoke 9 moves the release bearing longitudinally on the guide tube 13 which is shown in broken lines in FIG. 1. The shaft of the gearbox revolves inside the guide tube 13.

A collar 16 of elastic material such as plastic or rubber is molded to or otherwise affixed to the inner surface of the inner ring 1. Portion 16a of the elastic collar 16 possesses, on its internal surface, a plurality of projections in the form of ridges 17 arranged in groups and separated by portions 18 of lesser thickness as best seen in FIG. 5. The ridges 17 extend substantially radially but are nevertheless inclined relative to the radial direction as shown in FIG. 5, so as to assist the deformation of the said ridges by flexing in a substantially tangential direction during the self-alignment of the release bearing at the instant of declutching. It will be appreciated that other profiles could be adopted for these ridges to provide the desired elastic self-alignment of the release bearing.

In the embodiment shown in FIGS. 1 and 5, the profile of the ridges 17 is such that their width diminishes inwardly to improve their flexibility. Accordingly, the area of contact between the ridges 17 and the guide tube 13 is circumferentially thin relative to the broadened base of the ridges 17.

Portion 16b of the elastic collar 16, located on the side of the release yoke 9, is of reduced thickness and is free from radial ridges as seen in FIG. 1.

A guide socket 19 is mounted between the guide tube 13 and the inner ring 1. The socket 19 has a radial annular flange 19a which is contacted and biased by yoke 9 into frictional contact with the radial flange 5 of the release bearing, which can move laterally with respect to the socket 19 during declutching. An axial cylindrical portion 19b of the socket 19 extends between the inner ring 1 and the guide tube 13. A space is provided between the portion 16b of the elastic collar 16 and the cylindrical portion 19b of the guide socket 19 so these two elements do not come into contact even during the self-alignment movement of the release bearing.

In the embodiment shown in FIGS. 1 and 5, the guide socket 19 has a series of axial extensions 20 connected to the portion 19b and seating between the groups of radial ridges 17 of the elastic collar 16. These axial extensions 20 thus define portions of the guide socket 19 which have substantially the same length as the total length of the elastic collar 16. Openings between the extensions 20 allow groups of ridges 17 to pass into contact with the guide tube 13 as can be seen in FIGS. 1 and 5. Furthermore, the thickness of the collar 16 opposite these extensions 20 is reduced at 18 to avoid contact between the elastic collar 16 and the guide socket 19 during the declutching operation. It can be seen that the extensions 20 on the guide socket 19, which are capable of a certain play and can thus slide freely relative to the guide tube 13, provide a maximum guide length which occupies substantially the entire length of the release bearing itself. The space which extends axially between the front end face of the radial ridges 17 and the extreme edge of the cylindrical portion 19b of the guide socket 19 can serve as a lubricant reserve for the sliding motion of the release bearing and of the guide socket on the guide tube. The guide socket is advantageously made of a rigid material and preferably of a metal, being formed by stamping a thin metal sheet or a tube.

When the declutching release yoke 9 is actuated to bring the outer ring 10 into contact with the diaphragm 12, any pivoting or inclination of the release bearing is deterred or prevented by virtue of the guiding provided by the socket 19 relative to the guide tube 13, and by virtue of the presence of the flange 19a in contact with the flange 5. The lateral self-alignment function is achieved by the flexing of the radial ridges 17 in direct contact with the guide tube 13. The presence of the guide socket 19, does not in any way interfere with the self-alignment properties of the release bearing.

Figure 2:
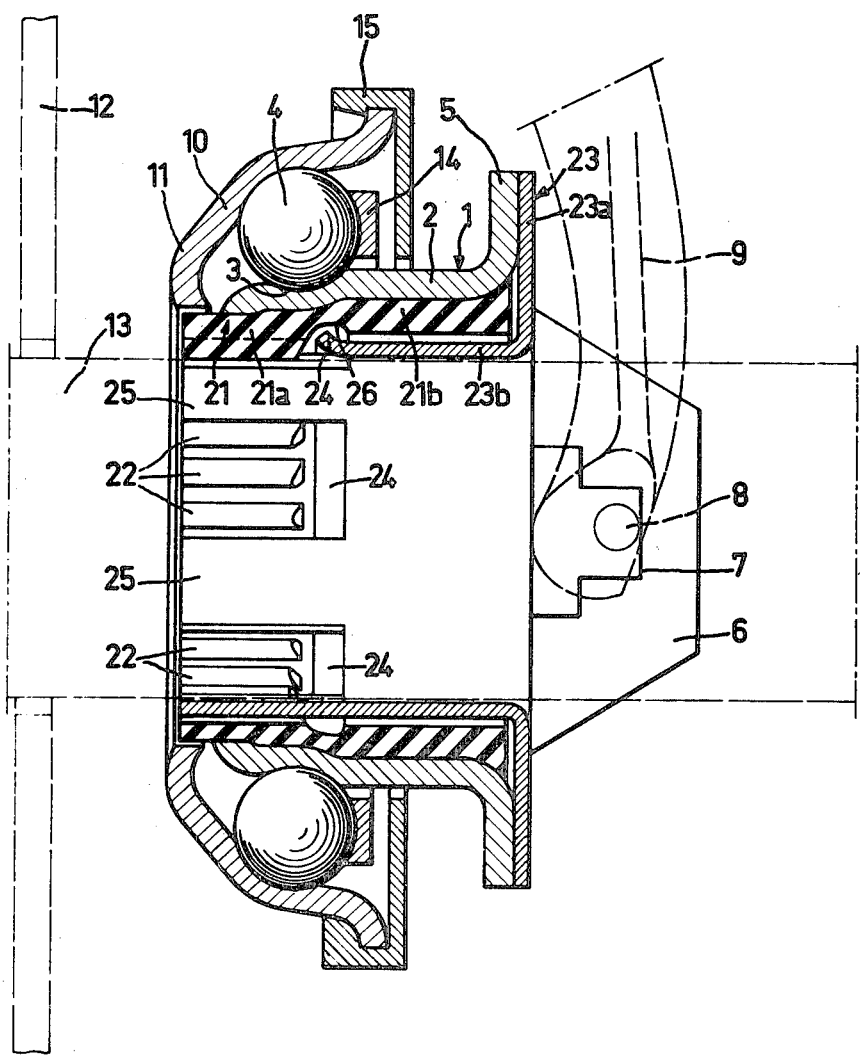
FIG. 2 is a view in cross-section of another embodiment of a release bearing according to the invention.

The embodiment illustrated in FIG. 2 constitutes a variant of the release bearing illustrated in FIG. 1. In this embodiment, where the identical components carry the same reference numbers, the elastic collar 21 has a portion 21b and a portion 21a which is equipped with teeth 22 of structure identical in every respect to the teeth 17, and grouped in the same way. The guide socket 23 has the same general structure as the socket 19, including flange portion 23a except that radial rims 24 are formed on the edges of the cylindrical portion 23b corresponding to the portion 19b of FIG. 1. These radial rims 24, which are thus located between the axial extensions 25 identical with the extensions 20, co-operate with an annular groove 26 formed in the elastic collar 21 between portions 21a and 21b. As can be seen in FIG. 2, when the release bearing is mounted on the guide tube 13, the dimensions of these outward-pointing radial rims 24 and the depth of the annular groove 26 are such that these components do not come into contact, sufficient play being maintained even during the self-alignment of the release bearing.

When the release bearing is not mounted on the guide tube 13, the location of these radial rims 24 in the annular groove 26 avoids inadvertent separation of the guide socket 23 from the remainder of the release bearing, thereby facilitating the handling of the bearing assembly.

Figure 3:
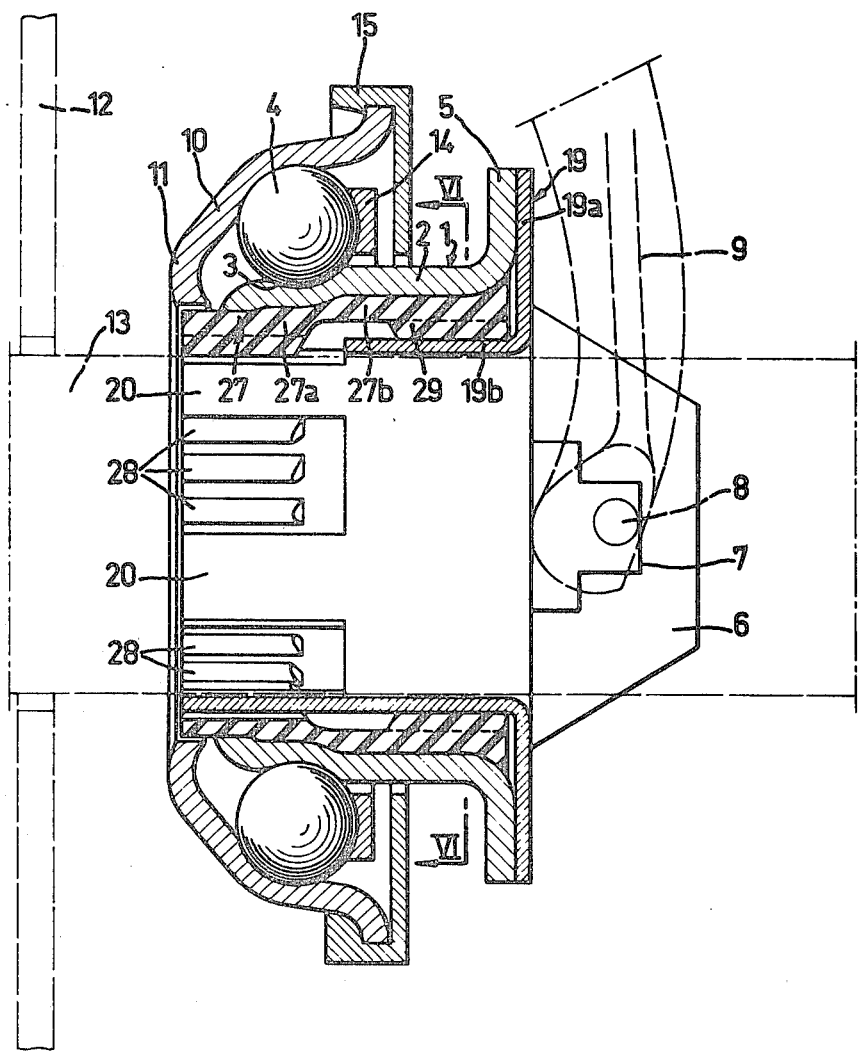
FIG. 3 shows, in cross-section, another embodiment of a release bearing according to the invention.

In the embodiment of FIG. 3, where identical components carry the same reference numbers, the elastic collar 27 has, as before, a portion 27a provided with groups of ridges 28 which come into direct contact with the guide tube 13 and are in every respect identical with the ridges 17 and 22 of the preceding embodiments.

Figure 6:
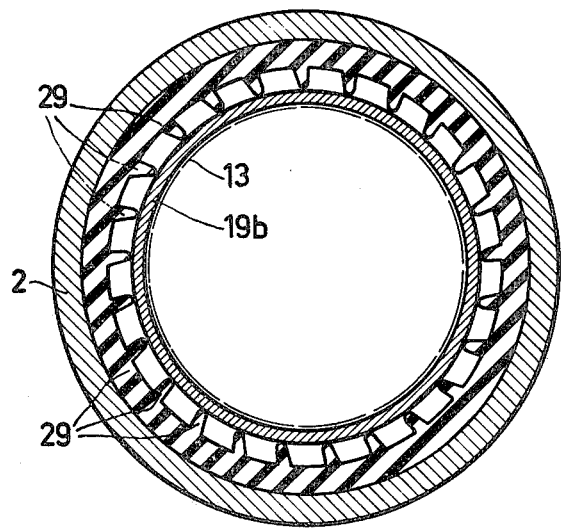
FIG. 6 is a section along VI—VI of FIG. 3.

The guide socket 19 is identical to that of the embodiment of FIG. 1. The elastic collar 27, however, possesses in its portion 27b, located on the side of the declutching release yoke 9, a plurality of auxiliary radial ridges 29 which can be seen in FIG. 6, extending parallel to the axis of the release bearing and coming into contact with cylindrical portion 19b of the outer surface of the guide socket 19. As can be seen more clearly in FIG. 6, the auxiliary ridges 29 which like ridges 28 are slightly inclined relative to the radial direction, have a lesser thickness than the radial ridges 28 to increase their flexibility. The self-alignment of the release bearing is principally achieved by the radial ridges 28 in direct contact with the guide tubes, while the guide socket 19 avoids the inclination or pivoting of the release bearing. By virtue of their flexibility, the auxiliary ridges 29 permit the self-alignment of the release bearing and also make it possible to improve the hold of the guide socket 19 in the release bearing when the assembly of these components is not mounted on the guide tube 13.

Figure 4:
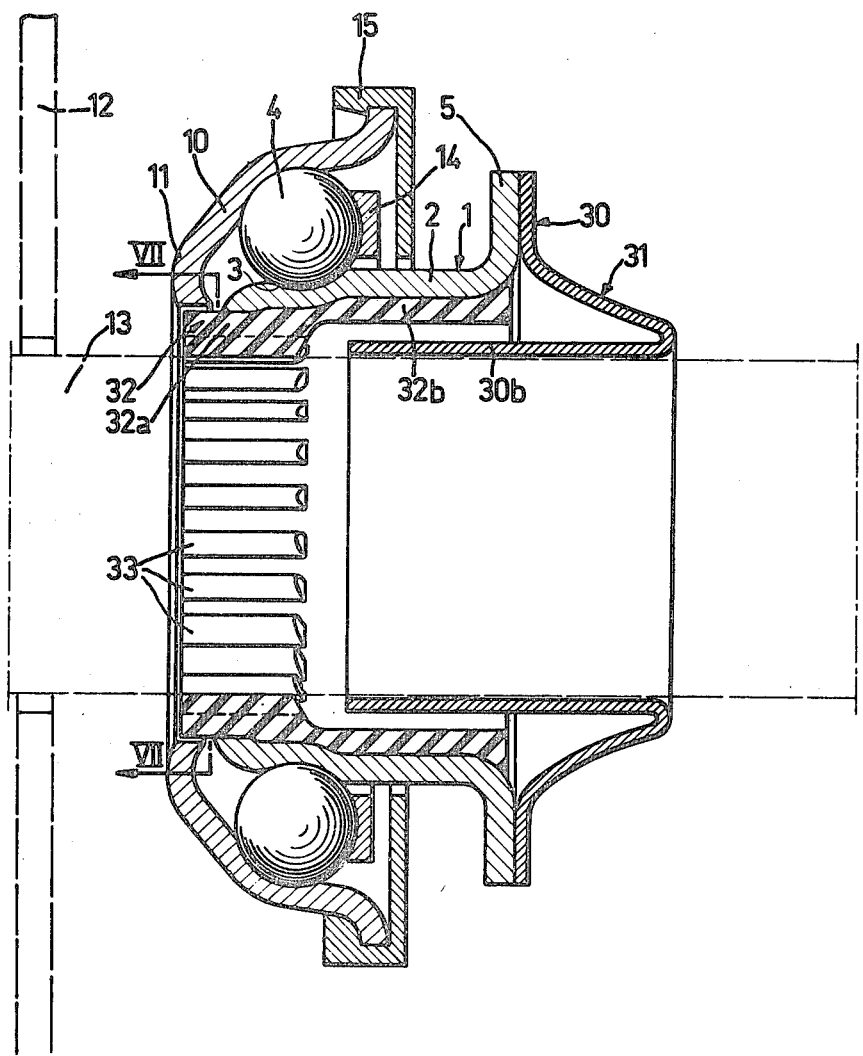
FIG. 4 is a view, similar to those above, which shows yet another embodiment of a release bearing provided with a different guide socket.
Figure 7:
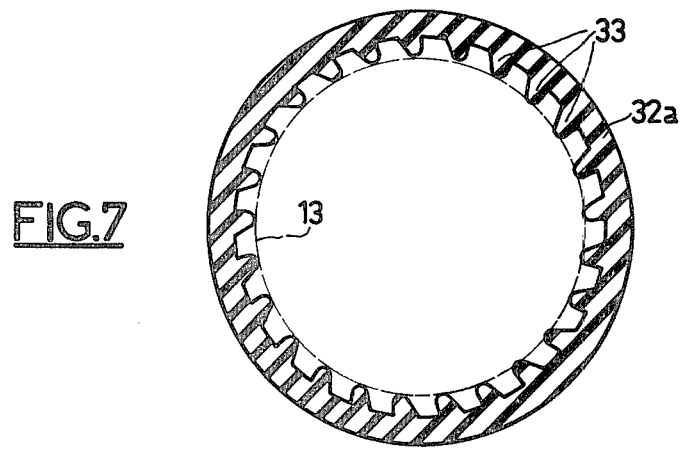
FIG. 7 is a section along VII—VII of FIG. 4.

The embodiment in FIG. 4 shows a different structure for the guide socket 30, which has an annular outer fold 31 obtained by shaping sheet metal and which has the effect of increasing the total guide length of the socket 30 on the guide tube 13. In this embodiment the increase in the guide length is thus achieved on the side of the declutching release yoke and not, as previously, be means of axial extensions pointing towards the diaphragm 12. In this embodiment, the elastic collar 32 has, on portion 32a on the side of diaphragm 12, a succession of uninterrupted radial ridges 33 arranged substantially uniformly over the inner periphery of the portion 32a as seen in FIG. 7. The ridges 33 have the same profile as the ridges 17 of FIG. 1. It is possible in this embodiment to provide a larger number of self-alignment ridges 33.

The portion 32b of elastic collar 32 has a thickness that enables sufficient play, permitting a movement of the release bearing during self-alignment, without coming into contact with the portion 30b of the guide socket 30, which is partially located between the portion 32b of the elastic collar 32 and the guide tube 13. Furthermore, the socket 30 has a radial flange 30a in frictional contact with the flange 5 of the inner ring.

It will be understood that the particular guide socket of this embodiment may use the structure of FIGS. 2 and 3, to ensure its retention to the release bearing before being mounted. In this case, the corresponding elastic collars would thus possess, in addition to the succession of ridges 33, an annular groove like the groove 26 or a succession of auxiliary ridges such as the ridges 29.

It will also be appreciated that the embodiment illustrated may be modified, without going outside the scope of the invention, by reducing the axial guide length of the sockets 19, 23 or 30 by omitting the axial extensions 20, 25 or the fold 31. However, such arrangements will provide less guiding of the socket. In all cases, the elastic collars are made from a plastic, rubber or from any other sufficiently flexible material. The guide sockets which slide with the release-bearing on the guide tube are made of a rigid material and in particular of shaped sheet metal.

The clutch release bearing of the present invention, equipped with its guide socket, permits elastic self-alignment and avoids any inclination or pivoting of the release bearing, thus considerably reducing the wear of the components in contact during each declutching operation.

As the invention may take many forms other than the disclosed preferred embodiments, it is emphasized that the invention is not limited to the disclosed embodiments but encompasses diverse equivalent structures which fall within the spirit of the following claims.

We claim:

1. A self-aligning clutch release bearing mountable on a guide tube in a clutch assembly, comprising,
   an outer bearing-race ring,
   an inner bearing-race ring concentric with the outer bearing-race ring and slidable axially with respect to the guide tube, said inner bearing-race ring having a radial flange,
   an elastic collar on the interior of the inner bearing-race ring, said elastic collar having a portion comprising a plurality of resilient internal projections which lie in direct contact with the guide tube, and a portion free from internal projections,
   a rigid guide socket having at least a portion thereof lying radially inwardly of the inner bearing-race ring and in direct contact with the guide tube, said guide socket having a radial flange in frictional contact with the radial flange of the inner bearing-race ring to deter inclination of the inner bearing-race ring relative to the guide tube,
   said guide socket being freely slidable relative to the guide tube and having a length substantially the same as the total length of the elastic collar, said guide socket including axial extensions which extend between said internal projections of the elastic collar, said guide socket having openings between said extensions to allow said internal projections of said elastic collar to contact the guide tube.

2. A clutch release bearing according to claim 1 wherein there is a lubricant reserve space located axially between an edge of the guide socket and the resilient internal projections of the elastic collar.

3. A clutch release bearing according to claim 1 wherein the guide socket has radially outturned rims, said elastic collar having an annular internal groove receiving the outturned rims to retain the socket on the release bearing before they are mounted on the guide tube.

4. A clutch release bearing according to claim 1 wherein the elastic collar has a plurality of auxiliary internal radial ridges which extend parallel to the bearing axis and lie in contact with the socket exterior.

5. A clutch release bearing according to claim 4 wherein said auxiliary internal radial ridges are more flexible than said resilient internal projections.

6. A self-aligning clutch release bearing mountable on a guide tube in a clutch assembly, comprising:
   an outer bearing-race ring,
   an inner bearing-race ring concentric with the outer bearing-race ring and slidable axially with respect to the guide tube, said inner bearing-race ring having a radial flange, an elastic collar on the interior of the inner bearing-race ring, said elastic collar having a portion comprising a plurality of resilient internal projections regularly disposed within said collar and which lie in direct contact with the guide tube and a portion free from internal projections, a rigid guide socket having at least a portion thereof lying radially inwardly of said portion free from internal projections of said elastic collar with a space therebetween and in direct contact with the guide tube, said guide socket having a radial flange in frictional contact with the radial flange of the inner bearing-race ring to deter inclination of the inner bearing-race ring relative to the guide tube, said guide socket being reversely bent at an annular fold located outside said inner bearing-race ring to increase its total guide length.

7. A clutch release bearing according to claim 6 wherein the elastic collar has an area of reduced thickness, said guide socket having a portion lying within and spaced from the area of reduced thickness.

* * * * *

UNITED STATES PATENT AND TRADEMARK OFFICE
CERTIFICATE OF CORRECTION

PATENT NO. : 4,181,380
DATED : January 1, 1980
INVENTOR(S) : RENE VINEL ET AL

It is certified that error appears in the above—identified patent and that said Letters Patent is hereby corrected as shown below:

In the heading of the patent

Between items [22] and [51], add the following:

--[30] Foreign Application Priority Data

March 25, 1977 [FR]  France 77 09095--

In item [73], change "Mechaniques" to --Mecaniques--.

Signed and Sealed this

Eighth Day of July 1980

[SEAL]

Attest:

SIDNEY A. DIAMOND

Attesting Officer

Commissioner of Patents and Trademarks